(12) United States Patent
Struhsaker

(10) Patent No.: US 7,346,347 B2
(45) Date of Patent: Mar. 18, 2008

(54) APPARATUS, AND AN ASSOCIATED METHOD, FOR PROVIDING WLAN SERVICE IN A FIXED WIRELESS ACCESS COMMUNICATION SYSTEM

(75) Inventor: Paul F. Struhsaker, Plano, TX (US)

(73) Assignee: Raze Technologies, Inc., Plano, TX (US)

( * ) Notice: Subject to any disclaimer, the term of this patent is extended or adjusted under 35 U.S.C. 154(b) by 802 days.

(21) Appl. No.: 09/839,499

(22) Filed: Apr. 20, 2001

(65) Prior Publication Data

US 2002/0098843 A1 Jul. 25, 2002

Related U.S. Application Data

(60) Provisional application No. 60/262,708, filed on Jan. 19, 2001, provisional application No. 60/262,712, filed on Jan. 19, 2001, provisional application No. 60/262,825, filed on Jan. 19, 2001, provisional application No. 60/262,698, filed on Jan. 19, 2001, provisional application No. 60/262,827, filed on Jan. 19, 2001, provisional application No. 60/262,826, filed on Jan. 19, 2001, provisional application No. 60/262,951, filed on Jan. 19, 2001, provisional application No. 60/262,824, filed on Jan. 19, 2001, provisional application No. 60/263,101, filed on Jan. 19, 2001, provisional application No. 60/263,097, filed on Jan. 19, 2001, provisional application No. 60/273,579, filed on Mar. 5, 2001, provisional application No. 60/262,955, filed on Jan. 19, 2001, provisional application No. 60/273,689, filed on Mar. 5, 2001, provisional application No. 60/273,757, filed on Mar. 5, 2001, provisional application No. 60/270,378, filed on Feb. 21, 2001, provisional application No. 60/270,385, filed on Feb. 21, 2001, provisional application No. 60/270,430, filed on Feb. 21, 2001.

(51) Int. Cl.
*H04Q 7/20* (2006.01)

(52) U.S. Cl. .................. 455/426.2; 455/443; 455/554.2

(58) Field of Classification Search ................ 455/403, 455/404.2, 414.2, 456, 556, 426.2, 3.05, 455/73, 422.1, 443, 444, 561, 562.1, 3.06, 455/554.2; 342/457; 701/200; 340/905
See application file for complete search history.

(56) References Cited

U.S. PATENT DOCUMENTS

| 5,115,463 | A | * | 5/1992 | Moldavsky et al. ......... 455/465 |
| 5,416,831 | A | * | 5/1995 | Chewning et al. ........ 379/93.25 |
| 5,475,735 | A | | 12/1995 | Williams et al. .............. 379/59 |
| 5,604,789 | A | * | 2/1997 | Lerman ..................... 455/454 |
| 5,638,371 | A | | 6/1997 | Raychaudhuri et al. ..... 370/347 |

(Continued)

FOREIGN PATENT DOCUMENTS

EP 0 690 637 A2 1/1996

(Continued)

*Primary Examiner*—William Trost
*Assistant Examiner*—James D Ewart

(57) ABSTRACT

Apparatus, and an associated method, for providing WLAN (wireless local area network) service through a fixed wireless access communication system. WLAN transceivers are fixed in position at subscriber stations of the fixed wireless access communication system. Each WLAN transceiver defines a coverage area. Through appropriate positioning of the WLAN transceivers at the subscriber stations, overlapping coverage areas are formable and between which handovers of communications with a mobile station are effectuated when a mobile station travels out of one coverage area and into another coverage area.

23 Claims, 3 Drawing Sheets

U.S. PATENT DOCUMENTS

| | | | |
|---|---|---|---|
| 5,673,307 A * | 9/1997 | Holland et al. | 455/436 |
| 5,684,791 A | 11/1997 | Raychaudhuri et al. | 370/278 |
| 5,694,424 A | 12/1997 | Ariyavisitakul | 375/233 |
| 5,790,936 A * | 8/1998 | Dinkins | 455/3.05 |
| 5,809,086 A | 9/1998 | Ariyavisitakul | 375/332 |
| 5,901,352 A * | 5/1999 | St-Pierre et al. | 455/426.1 |
| 5,915,215 A * | 6/1999 | Williams et al. | 455/422.1 |
| 5,991,292 A | 11/1999 | Focsaneanu et al. | 370/352 |
| 6,023,459 A * | 2/2000 | Clark et al. | 370/329 |
| 6,097,968 A * | 8/2000 | Bannister et al. | 455/561 |
| 6,150,955 A * | 11/2000 | Tracy et al. | 340/870.02 |
| 6,188,873 B1 | 2/2001 | Wickman et al. | 455/11.1 |
| 6,363,252 B1 * | 3/2002 | Hamalainen et al. | 455/436 |
| 6,378,119 B1 * | 4/2002 | Raves | 716/10 |
| 6,526,290 B1 * | 2/2003 | Yla-Mella et al. | 455/561 |
| 6,560,213 B1 * | 5/2003 | Izadpanah et al. | 370/338 |
| 2001/0041569 A1 * | 11/2001 | Rahman | 455/436 |
| 2002/0164991 A1 * | 11/2002 | Arazi et al. | 455/450 |

FOREIGN PATENT DOCUMENTS

| | | |
|---|---|---|
| EP | 0 690 638 A2 | 1/1996 |
| EP | 690638 A2 * | 1/1996 |
| WO | WO99/09762 | 2/1999 |
| WO | WO99/29126 | 6/1999 |

* cited by examiner

APPARATUS, AND AN ASSOCIATED METHOD, FOR PROVIDING WLAN SERVICE IN A FIXED WIRELESS ACCESS COMMUNICATION SYSTEM

The present invention claims priority to U.S. Provisional Application Ser. No. 60/262,708 filed Jan. 19, 2001.

CROSS-REFERENCE TO RELATED APPLICATIONS

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIRELESS AND WIRELINE ACCESS SYSTEMS";
2) Ser. No. 09/838,810, filed Apr. 20, 2001, entitled "WIRELESS COMMUNICATION SYSTEM USING BLOCK FILTERING AND FAST EQUALIZATION-DEMODULATION AND METHOD OF OPERATION";
3) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
4) Ser. No. 09/839,729, filed Apr. 20, 2001, entitled "APPARATUS ANT) METHOD FOR OPERATING A SUBSCRIBER INTERFACE IN A FIXED WIRELESS SYSTEM";
5) Ser. No. 09/839,719, filed Apr. 20, 2001, entitled "APPARATUS AND METHOD FOR CREATING SIGNAL AND PROFILES AT A RECEIVING STATION";
6) Ser. No. 09/838,910, filed Apr. 20, 2001, entitled "SYSTEM AND METHOD FOR INTERFACE BETWEEN A SUBSCRIBER MODEM AND SUBSCRIBER PREMISES INTERFACES";
7) Ser. No. 09/839,509, filed Apr. 20, 2001, entitled "BACKPLANE ARCHITECTURE FOR USE IN WIRELESS AND WIRELINE ACCESS SYSTEMS";
8) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
9) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
10) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";
11) Ser. No. 09/839,457, filed Apr. 20, 2001, entitled "WIRELESS ACCESS SYSTEM FOR ALLOCATING AND SYNCHRONIZING UPLINK AND DOWNLINK OF TDD FRAMES AND METHOD OF OPERATION";
12) Ser. No. 09/839,075, filed Apr. 20, 2001, entitled "TDD FDD AIR INTERFACE";
13) Ser. No. 09/839,458, filed Apr. 20, 2001, entitled "WIRELESS ACCESS SYSTEM USING MULTIPLE MODULATION";
14) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
15) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM";
16) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
17) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";
19) Ser. No. 60/262,712, filed on Jan. 19, 2001, entitled "WIRELESS COMMUNICATION SYSTEM USING BLOCK FILTERING AND FAST EQUALIZATION-DEMODULATION AND METHOD OF OPERATION";
20) Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
21) Ser. No. 60/262,698, filed on Jan. 19, 2001, entitled "APPARATUS AND METHOD FOR OPERATING A SUBSCRIBER INTERFACE IN A FIXED WIRELESS SYSTEM";
22) Ser. No. 60/262,827, filed on Jan. 19, 2001, entitled "APPARATUS AND METHOD FOR CREATING SIGNAL AND PROFILES AT A RECEIVING STATION";
23) Ser. No. 60/262,826, filed on Jan. 19, 2001, entitled "SYSTEM AND METHOD FOR INTERFACE BETWEEN A SUBSCRIBER MODEM AND SUBSCRIBER PREMISES INTERFACES";
24) Ser. No. 60/262,951, filed on Jan. 19, 2001, entitled "BACKPLANE ARCHITECTURE FOR USE IN WIRELESS ANT) WIRELINE ACCESS SYSTEMS";
25) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
26) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
27) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";
28) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
29) Ser. No. 60/262,955, filed Jan. 19, 2001, entitled "TDD FDD AIR INTERFACE";
30) Ser. No. 60/273,689, filed Mar. 5, 2001, entitled "WIRELESS ACCESS SYSTEM USING MULTIPLE MODULATION";

31) Ser. No. 60/273,757, filed Mar. 5,2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
32) Ser. No. 60/270,378, filed Feb. 21, 2001, entitled "APPARATUS FOR ESTABLISHING A PRIORITY CALL IN A FIXED WIRELESS ACCESS COMMUNICATION SYSTEM";
33) Ser. No. 60/270,385, filed Feb. 21, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM"; and
34) Ser. No. 60/270,430, filed Feb. 21, 2001, entitled "METHOD FOR ESTABLISHING A PRIORITY CALL IN A FIXED WIRELESS ACCESS COMMUNICATION SYSTEM".

The above applications are commonly assigned to the assignee of the present invention. The disclosures of these related patent applications are hereby incorporated by reference for all purposes as if fully set forth herein The present invention relates generally to a manner by which to provide mobile communications in a fixed wireless access (FWA) communication system. More particularly, the present invention relates to apparatus, and an associated method, for providing WLAN (wireless local area network) service at a subscriber station of the fixed wireless access communication system. Mobile stations operation in the WLAN are thereby able to communicate in the WLAN coverage area encompassing the subscriber station. When WLAN service is provided to a plurality of fixed-site subscriber stations, cellular coverage areas are formed, between which handovers of communications are permitted all by way of the fixed wireless access communication system

BACKGROUND OF THE INVENTION

Advancements in communication technologies have permitted the development, and implementation, of new types of communication systems. Such communication systems are able to permit the communication of increased amounts of data at increased thruput rates relative to conventional communication systems. And, such new communication systems have permitted communication of information at, and between, communication stations positioned at locations from which communications have conventionally been inconvenient or impractical.

Radio communication systems, for instance, are exemplarily of communication systems of which new types, and improvements to existing types, have been made possible as a result of advancements in communication technologies. Similar to other types of communication systems, in a radio communication system, information is communicated between a sending station and a receiving station by way of a communication channel. In a radio communication system, unlike other types of communication systems, a communication channel formed between the sending and the receiving stations and upon which information is communicated by the sending station to the receiving station, is formed of a portion of the electromagnetic spectrum. Radio links are defined upon the portion of the electromagnetic spectrum allocated to the radio communication system.

Because a radio link is utilized upon which to form communication channels, a fixed, or wireline, connection is not required to be formed between the sending and receiving stations to form a communication channel. Information can be communicated between the sending and receiving stations at, and between, locations at which conventional wireline communications would not be permitted. Additionally, the infrastructure costs associated with the installation of a radio communication system are also generally lower than the corresponding costs which would be required to install a conventional, wireline communication system. And, as the advancements in communication technologies have permitted the bandwidth allocated to a radio communication system to be utilized more efficiently, a radio communication can increasingly be utilized effectuate a communication service which require relatively significant data thruput capability.

A wireless broadband communication system has been proposed, for instance, by which to permit the effectuation of any of various communication services by way of radio links with fixed-site subscriber stations. Radio links are formed with the subscriber stations by fixed-site base stations. The base stations are installed at spaced-apart locations throughout the geographical area which is to be encompassed by the wireless broadband communication system. Several subscriber stations are capable of communicating with a single base station.

Communication of data is effectuated between the subscriber stations and an associated base station by way of radio links upon which communication channels are defined. Because radio links are utilized between the subscriber stations and the base stations, the infrastructure costs associated with the formation of wireline connections between the subscriber stations are obviated. Broadband communications, and communication services which require the communication of broadband data, as well as communication services necessitating smaller data thruput rates are effectuable through use of the wireless broadband communication system.

Advancements in communication technologies have also permitted the development, and introduction, of other types of radio communication systems. Wireless communication systems, sometimes referred to as micro-cellular networks, private networks, and WLANs (wireless local area networks) are exemplary of such systems. Such networks, generally, provide for radio communications with mobile stations positioned within communication range of such networks.

Generally, the communication ranges of the mobile stations operable in such systems is relatively small as relatively low-power signals are originated at the mobile stations and, correspondingly, originated at the network infrastructure of such systems to be terminated at the mobile stations. The network infrastructure of such systems typically include fixed-location transceivers, sometimes referred to as access points. The access points are capable of communicating with a group of mobile stations positioned within a micro-cellular, or other, area defined by the access point. In some of such systems, the access points are coupled to a conventional, local area network, also used to interconnect the processing stations of an office computer system. In other such systems, the access points are connected in other manners.

Installation of a wireless broadband communication system to provide broadband services with a plurality of subscriber stations provides a radio infrastructure throughout a geographical area throughout which wireless broadband communication services are effectuable. If a manner could be provided by which to utilize the communication capabilities of a wireless broadband communication system to provide additional communication services, additional benefits of a wireless broadband communication system would be provided.

It is in light of this background information related to radio communication systems that the significant improvements of the present invention have evolved.

SUMMARY OF THE INVENTION

The present invention, accordingly, advantageously provides apparatus, and an associated method, by which to provide mobile communications in a fixed wireless access (FWA) communication system.

Through operation of an embodiment of the present invention, WLAN (wireless local area network) service is provided to a subscriber station of the fixed wireless access communication system. Mobile stations within communication range of the subscriber station, and operable in the WLAN, are able to communicate by way of the WLAN. By providing WLAN service to a plurality of subscriber stations and thereafter providing integrated control over WLAN communications, handover of communications with a mobile station is provided as the mobile station travels between coverage areas formed at separate ones of the subscriber stations.

In one aspect of the present invention, a WLAN transceiver, such as an access point, is installed at a subscriber station of a fixed wireless access communication system. A WLAN transceiver provides localized radio communications throughout a coverage area defined by the communication range of the WLAN transceiver and mobile stations with which WLAN transceiver communications. More than one WLAN transceiver is positionable at the subscriber station, as appropriate. Radio communications between a mobile station and the WLAN transceiver provide for two-way communications with the mobile station.

In another aspect of the present invention, the WLAN transceiver positioned at the subscriber station is, in turn, coupled by way of a radio link with a base station of the fixed wireless access communication system. Information originated at a mobile station is communicated by way of a local radio link to the WLAN transceiver. The WLAN transceiver, in turn, is coupled to a transceiver station, such as an IAD (integrated access device), located at the subscriber station and operable in the fixed wireless access communication system. The integrated access device, or other subscriber-station transceiver, in turn, communicates the information originated at the mobile station to the base station of the fixed wireless access system. Thereafter, the information is forwarded, as appropriate, to a destination. Analogously, information originated at, or provided to, a base station operable in the fixed wireless access communication system and which is to be terminated at the mobile station is communicated by the base station to the integrated access device, or other subscriber-station transceiver. Subsequent to reception thereat, the information is forwarded to the WLAN transceiver to be transmitted therefrom by way of the local radio link through the mobile station. Thereby, communication is effectuable between mobile station and the base station of the fixed wireless access communication system.

In another aspect of the present invention, the WLAN transceivers are installed at a plurality of subscriber stations such that the coverage areas of the separately-installed transceivers at least partially overlap. Integrated control over operation of the WLAN transceivers is provided at the network of the fixed wireless access communication system. Mobile stations which travel between coverage areas defined by different ones of the WLAN transceivers are permitted continued communication by way of local radio links by handing over communications between WLAN transceivers. Ongoing communication sessions with the mobile station continue in spite of handover of communications between the WLAN transceivers.

In another aspect of the present invention, a routing map is maintained at a location coupled to, or integrated within, the fixed wireless access communication system. The routing map maintains a listing of the location of mobile stations operable to communicate by way of local radio links with WLAN transceivers positioned at different ones of the subscriber stations of the fixed wireless access communication system. The locations at which the mobile stations are positioned are updated, as needed, as a mobile station travels between coverage areas defined by different ones of the WLAN transceivers. When information is to be communicated to a particular mobile station, the routing map is accessed to retrieve indications of the location at which the mobile station at which the information is to be terminated is positioned. Through use of the indications retrieved from the routing map, the information which is to be communicated to the mobile station is able to be most-efficiently routed to the mobile station.

In another aspect of the present invention, when a handover of communications is effectuated, the routing map is updated, and information routed to the mobile by way of a WLAN transceiver from which a handover of communication is effectuated, but not yet delivered to the mobile station, is retrieved and then re-routed to the mobile station by way of the mobile station to which communications have been handed over.

In these and other aspects, therefor, apparatus, and an associated method, is provided for a fixed wireless access communication system. The fixed wireless access communication system has at least a first fixed-site base station and at least a first fixed-site subscriber station capable of communicating with the first fixed-site base station. Radio communication with a mobile station is facilitated. A first local-network radio transceiver is positioned at the at least first fixed-site subscriber station. The first local-network radio transceiver selectably transceives communication signals with the mobile station upon a first local radio link formed between the first local-network radio transceiver and the mobile station when the mobile station is positioned within a selected range of the first fixed-site subscriber station.

A more complete appreciation of the present invention and to the scope thereof can be obtained from the accompanying drawings which are briefly summarized below, the following detailed description of the presently-preferred embodiments of the invention, and the appended claims.

DETAILED DESCRIPTION OF THE INVENTION

Figure 1:
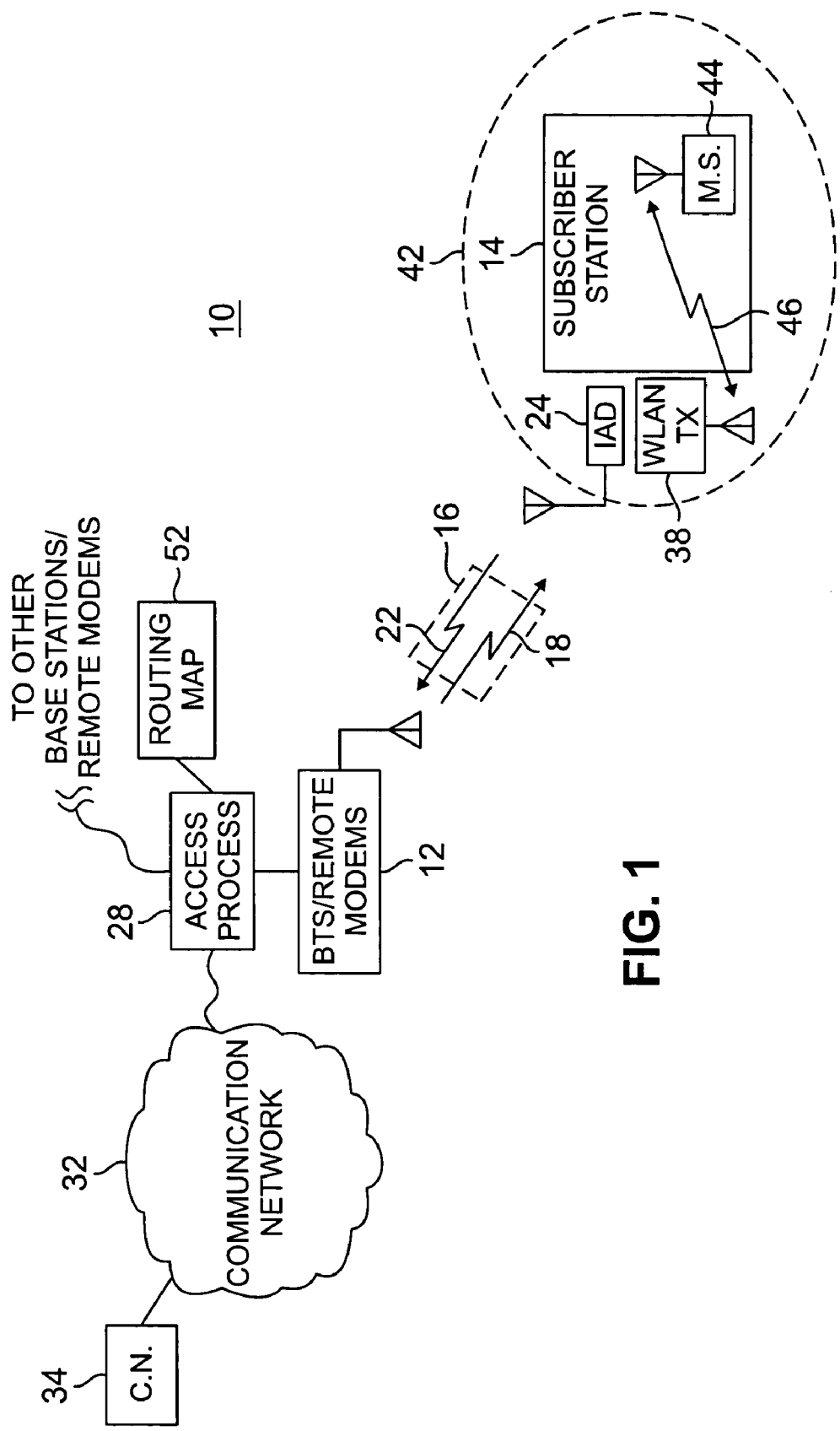
FIG. 1 illustrates a functional block diagram of a fixed wireless access (FWA) communication system in which an embodiment of the present invention is operable.

Referring to FIG. 1, a fixed wireless access (FWA) communication system 10 provides for radio communications between fixed-site base stations, of which the base station 12 is exemplary and fixed-site subscriber stations 14 of which the subscriber station 14 is exemplary. A radio link 16 upon which forward link channels 18 and reverse link channels 22 is of a bandwidth permitting broadband communication services to be effectuated with devices located at the subscriber station 14.

In the exemplary implementation, an integrated access device (IAD) 24 forms a transceiver located at the subscriber station and at which forward link signals transmitted upon the forward link channels of the radio link are detectable and which generate reverse link signals for transmission upon the reverse link channels of the radio link. A separate IAD 24 is located at each subscriber station of the communication system.

In the exemplary implementation, each base transceiver station includes a remote modem (modulator-demodulator) capable of communicating with seven separate subscriber stations located within a radial sector. In other implementations, the circuitry of the base transceiver station is configured in other manners.

The base station 12, and the set of remote modems thereof, is coupled to an access process 28 which is operable, amongst other things, to perform control operations to control operation of the communication system. The access process 28 is, in turn, coupled to a communication network 32 such as a public-switched telephonic network or a packet data network. And, a correspondent node 34 is coupled to the communication network. A communication path is formable between the correspondent node and the IAD 24 positioned at the subscriber station by way of the communication network, the access process 28, the base station 12, and the radio link 16. Communication of information by the correspondent node to the integrated access device and from the integrated access device to the correspondent node is effectuable by way of the communication path.

Pursuant to an embodiment of the present invention, a WLAN (wireless local area network) transceiver 38 is positioned at the subscriber station 14 at the integrated access device 24 to be connected to the transceiver circuitry of the integrated access device. The WLAN transceiver defines a coverage area 42 defining a cell. A mobile station 44 positioned within the cell 42 is capable of communicating with the transceiver 38. That is to say, the radio link 46 is formable between the transceiver 38 and the mobile station 44 upon which forward and reverse link signals are communicated therebetween. Signals originated at the mobile station are communicated upon reverse link channels of the radio link 46 to the WLAN transceiver 38. And, communication signals to be terminated at the mobile station 44 are communicated upon forward link channels of the radio link 46.

Because of the connection of the WLAN transceiver to the transceiver of the integrated access device 24, signals originated at the mobile station and communicated to the WLAN transceiver can, in turn, be provided to the transceiver of the integrated access device to be communicated upon reverse link channels of the radio link 16 and, thereafter, be communicated to another device, such as the correspondent node 34. Analogously, signals originated at the correspondent node, or elsewhere, can be communicated to the mobile station by way of forward link channels of the radio links 16 and 46 to the mobile station. Thereby communications are effectuable with a mobile station in the fixed wireless access communication system.

In the exemplary implementation, the integrated access device 24 forms a rack-assembly having expansion slots to receive expansion cards thereat. And, the WLAN transceiver is mounted upon, or is otherwise formed at, an expansion card connectable to the expansion slot of the rack-assembly. Thereby the integrated access device together with the WLAN transceiver form an integrated device providing for two-way communication upon the radio link 16 as well as two-way communication upon the radio link 46.

Figure 2:
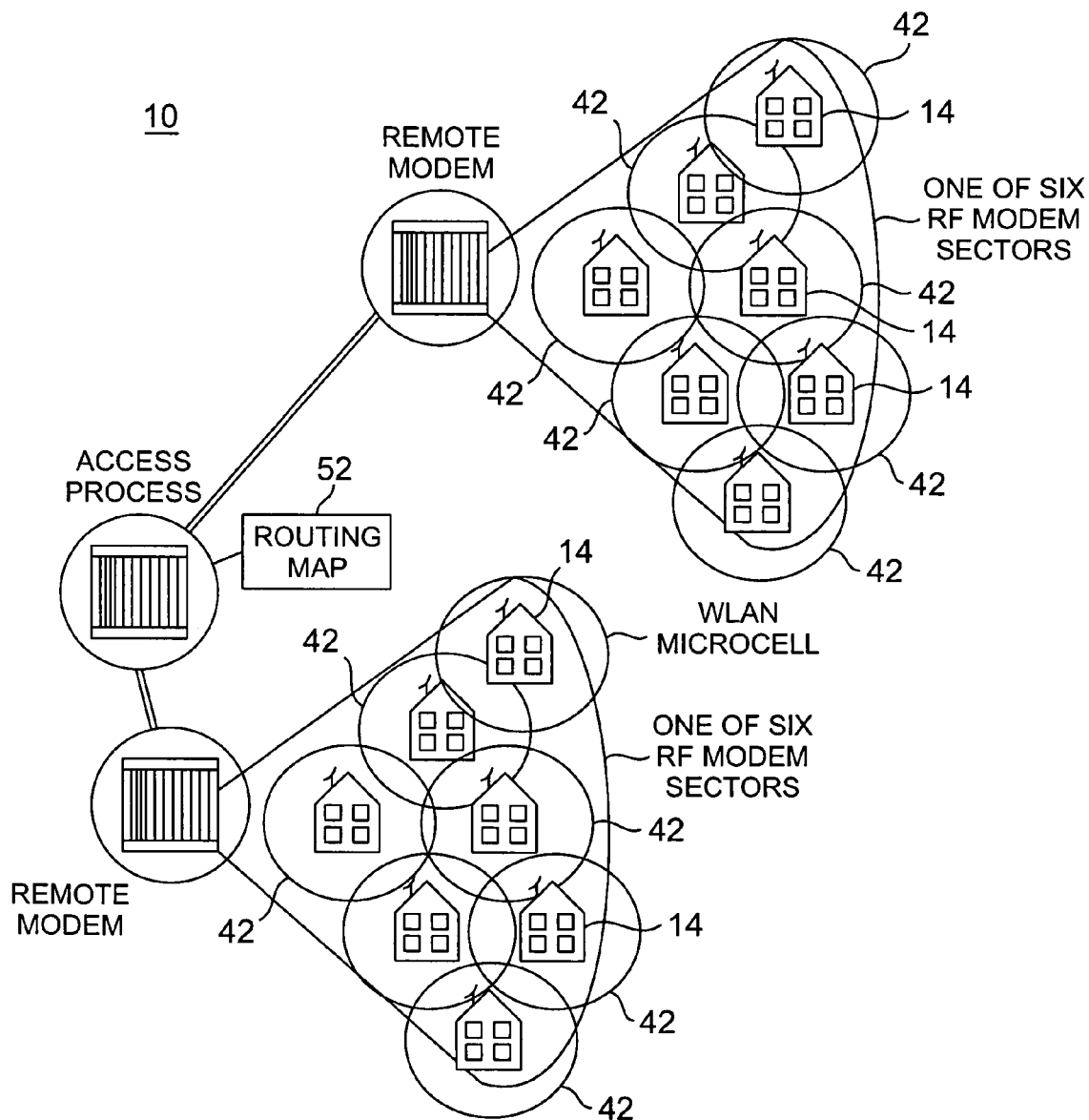
FIG. 2 illustrates a representation of a fixed wireless access communication system similar to that shown in FIG. 1 here also illustrating a plurality of cellular coverage areas defined by about a plurality of subscriber stations of the fixed wireless access communication system.

FIG. 2 illustrates another view of the communication system 10, here illustrating an implementation in which a plurality of subscriber stations 14 include WLAN transceivers 38 (shown in FIG. 1) connected to corresponding integrated access devices 24 (also shown in FIG. 1). The coverage areas 42 defined by respective ones of the WLAN transceivers are shown in the figure. Adjacent ones of the coverage areas over lap with one another. The remote modes of the base transceivers are again shown in the Figure as is the access process. An arrangement in which the remote modems communicate with subscriber stations positioned within a radio sector is shown in the figure. In other implementations, other arrangements are utilized.

A mobile station initially positioned within, or approximate to, a coverage area 42 defined by a WLAN transceiver positioned at a first subscriber station is permitted movement, such as out of the coverage area defined by the transceiver positioned at a first subscriber station and into the coverage area defined by a WLAN transceiver of another subscriber station. Through operation of an embodiment of the present invention, a handover of communications is effectuated from the first WLAN transceiver to another WLAN transceiver, thereby to permit continued communications with the mobile station.

Determination of when to initiate handover of communications is made responsive to measurements of signal characteristics of communication signals communicated between the WLAN transceiver and the mobile station. In one implementation signal characteristics are measured, or otherwise determined, at the mobile station and results of such measures or determinations of are reported back to the WLAN transceiver and appropriate control circuitry. Thereafter, if appropriate, the handover of communications is effectuated.

A routing map 52 is further shown in the figure. The routing map is functionally connected to the access process 28. The routing map includes a listing of the mobile stations, such as the mobile station 44 operable to transceive communication signals pursuant to the WLAN service. Indexed together with the listing the mobile stations are the locations at which the mobile stations are positioned. When communications are to be effectuated with a particular mobile station, such as communications originated by the correspondent node 34, the routing map is accessed and the communication signals are routed to the mobile stations at the position indicated in the routing map. And, when a handover is effectuated, information routed to a mobile station but not yet delivered is rerouted to the WLAN transceiver to which communications have been handed over.

Figure 3:
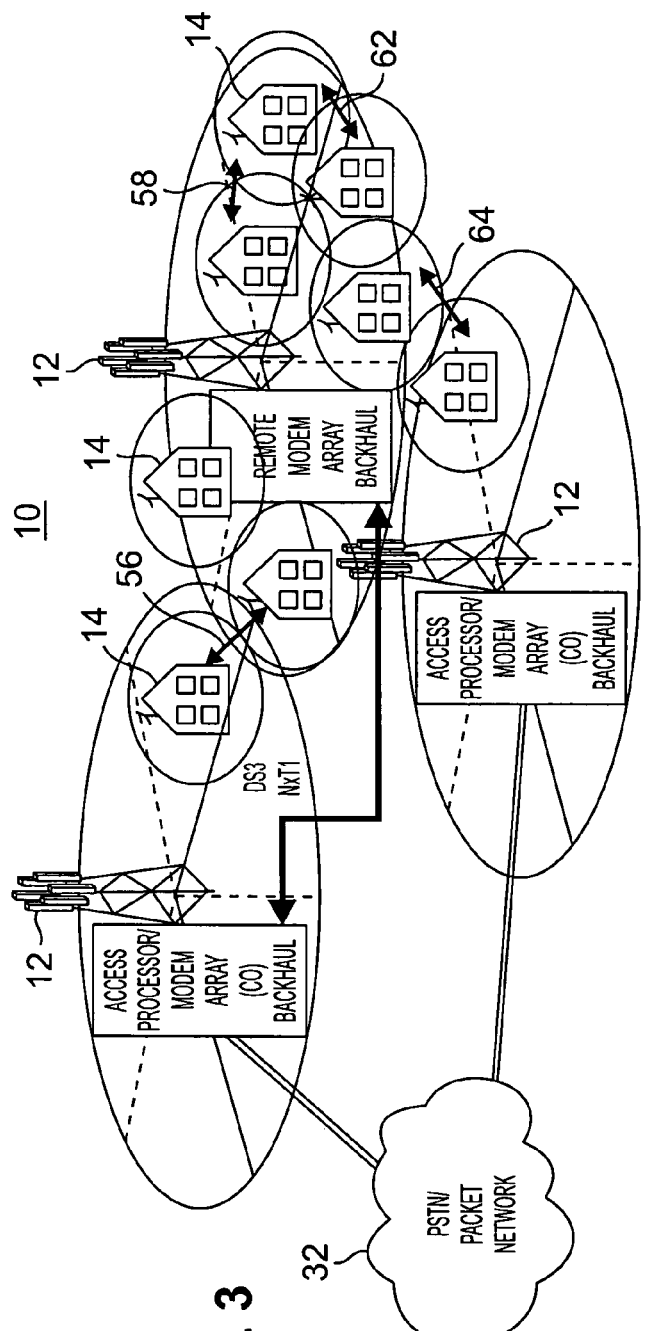
FIG. 3 illustrates another representation of the fixed wireless access communication system shown in FIGS. 1 and 2.

FIG. 3 again illustrates the communication system 10, here showing a plurality of base stations 12 and subscriber stations 14 associated with various ones of the base stations. Each of the subscriber stations includes a WLAN transceiver (shown in FIG. 1) various of the base transceiver stations are here shown also to be coupled by way of the communication network 32, again either a PSTN, a packet data network, or a combination of such networks. Movement of a mobile station between the coverage areas is defined by different ones of the subscriber stations are shown in the figure. For instance, movement of a mobile station indicated by the arrow 56 represents movement of the mobile station between subscriber stations associated with separate cells of separate base stations. Such movement results in access process routing of subsequent communication signals to a new cell of the fixed wireless access communication system, access process routing to a separate remote mode sector, and remote modem routing to a new subscriber integrated access device. The arrow 58 is representative of movement of a mobile station within a single sector of a single base station. Here, the result is a subscriber integrated access device to a remote modem routing change.

The arrow 62 is representative of movement of a mobile station between adjacent sectors defined by a single base station. Such movement results in access process routing of the communication signal to the new remote modem sector transceiver. And, the arrow 64 is representative of movement of a mobile station between sectors of different cells defined by two different base stations. Such movement results in access process to access process routing resolution, access processing routing to the new cell, access process routing to the new remote modem sector, and remote modem routing to the new subscriber access integrated device. Thereby, handovers of communications are effectuable through any movement of a mobile station between coverage areas defined by WLAN transceivers forming a portion of a fixed wireless access communication system.

Figure 4:
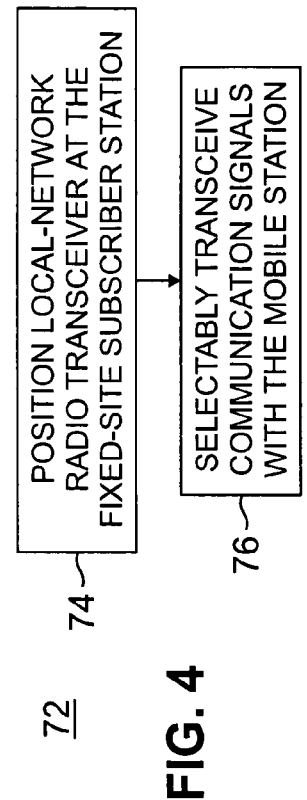
FIG. 4 illustrates a method flow diagram listing the method of operation of the method of an embodiment of the present invention.

FIG. 4 illustrates a method, shown generally at 72 of an embodiment of the present invention. The method facilitates radio communications with the mobile station in a fixed wireless access communication system having at least a first base station and at least a first subscriber station capable of communicating with the base station. First, and as indicated by the block 74, a local-network radio transceiver is positioned at the fixed-site subscriber station. Then, and as indicated by the block 76, communication signals are selectably transceived with the mobile station upon a first local radio link between the local-network radio transceiver and a mobile station when the mobile station is positioned within a coverage area defined by the local-network radio transceiver.

Through operation of the method of an embodiment of the present invention, WLAN service is provided in a fixed wireless access in a communication system. A mobile station operable in a wireless local area network is thereby able to communicate in the WLAN coverage area encompassing the subscriber station at which the local-network radio transceiver is positioned.

The previous descriptions are of preferred examples for implementing the invention, and the scope of the invention should not necessarily be limited by this description. The scope of the present invention is defined by the following claims.

What is claimed is:

1. In a fixed wireless access (FWA) communication system having at least a first fixed-site base station and at least first and second fixed-site subscriber stations each capable of wirelessly communicating with the first fixed-site base station, an apparatus for facilitating radio communication with a mobile station, said apparatus comprising:
   a local-network radio transceiver positioned at each of the at least first and second fixed-site subscriber stations, each said local-network radio transceiver selectably transceiving communication signals representing wireless communication of the fixed-site base station with the mobile station upon a local radio link formed between the respective local-network radio transceiver and the mobile station when the mobile station is positioned within a selected range of the fixed-site subscriber station at which the respective local-network radio transceiver is positioned and handing off to the other local-network radio transceiver when the mobile station moves outside the selected range of the fixed-site subscriber station at which the respective local-network radio transceiver is positioned but within the selected range of the other fixed-site subscriber station at which the other local-network radio transceiver is positioned.

2. The apparatus of claim 1 wherein the first and second fixed-site subscriber stations each include a large-area-network transceiver positioned thereat for transceiving wireless communication signals upon a large-area radio link with the fixed-site base station and wherein said local-network radio transceiver is coupled to the large-area-network transceiver such that wireless communication signals generated at the fixed-site base station, communicated upon the large-area radio link and received at the large-area-network transceiver, are routed to said local-area-network transceiver to be communicated to the mobile station upon the local radio link.

3. The apparatus of claim 2 wherein communication signals generated at the mobile station and communicated upon the local radio link to said local-network transceiver are routed to the large-area-network transceiver to be wirelessly communicated upon the large-area radio link to the fixed-sited base station.

4. The apparatus of claim 2 wherein the large-area-network transceiver comprises a rack assembly having at least one expansion slot at which card-mounted circuitry is connectable, thereafter to form a portion of the rack assembly and wherein said local-network transceiver comprises a local area network card connectable to the expansion slot.

5. In a fixed wireless access (FWA) communication system having at least a first fixed-site base station, a first fixed-site subscriber station capable of wirelessly communicating with the first fixed-site base station, and a second fixed-site subscriber station capable of communicating with the first fixed-site base station, an apparatus comprising:
   a first local-network radio transceiver positioned at the first fixed-site subscriber station said first local-network radio transceiver selectably transceiving communication signals representing wireless communication of the fixed-site base station with the mobile station upon a first local radio link formed between the first local-network radio transceiver and the mobile station when the mobile station is positioned within a selected range of the first fixed-site subscriber station; and
   a second local-network transceiver positioned at the second fixed-site subscriber station, said second local-network radio transceiver selectably transceiving communication signals representing wireless communication of the fixed-site base station with the mobile station upon a second local radio link formed between the second local-network radio transceiver and the mobile station when the mobile station is positioned within a selected range of the second fixed-site subscriber station.

6. The apparatus of claim 5 wherein said first local-network transceiver defines a first cellular area within which the mobile station is capable of transceiving the communication signals with said first local-network transceiver and wherein said second local-network transceiver defines a second cellular area within which the mobile station is capable of transceiving the communication signals with said second local-network transceiver.

7. The apparatus of claim 6 wherein the first cellular area defined by said first local-network transceiver and the second cellular area defined by said second local-network transceiver at least partially overlap and wherein selection is made of with which one of said first and second local-network transceivers, respectively, that the mobile station communicates responsive to determination of at least one communication parameter.

8. The apparatus of claim 7 wherein the at least one communication parameter responsive to which selection is made of with which one of said first and second local-network transceiver that the mobile station communicates comprises a signal quality parameter.

9. The apparatus of claim 7 wherein the at least one communication parameter responsive to which selection is made of with which one of said first and second local-network transceivers that the mobile station communicates comprises a system load-related parameter.

10. The apparatus of claim 6 wherein the mobile station is permitted movement at least between the first cellular area and the second cellular area and wherein communication hand-offs are performed between said first local-network transceiver and said second local-network transceiver responsive to movement of the mobile station between the first cellular area and the second cellular area defined by said first local-network transceiver and said second local-network transceiver, respectively.

11. In the fixed wireless access system of claim 10, a further improvement of a routing map coupled to the at least the first fixed-site base station, said routing map containing an indication of in which of the first cellular area and the second cellular area that the mobile station is positioned.

12. In the fixed wireless access system of claim 11 wherein the at least the first fixed-site base station is connected to an access processor and wherein said routing map is located at the access processor.

13. The routing map of claim 12 wherein the indication of in which cellular area that the mobile station is located is updated responsive to changes in location of the mobile station.

14. The routing map of claim 12 wherein routing of communication signals to the mobile station is selected responsive to values of the indication contained thereat.

15. The routing map of claim 14 wherein, subsequent to updating of the values of the indication contained thereat, and responsive to hand-off of communications between said first local-network radio transceiver and said second local-network radio transceiver, undelivered communication signals are rerouted according to updated values of the indication.

16. A method for communicating in a fixed wireless access (FWA) communication system having at least a first fixed-site base station, a first fixed-site subscriber station capable of wirelessly communicating with the first fixed-site base station, and a second fixed-site subscriber station capable of wirelessly communicating with the first fixed-site base station, a method comprising:

selectably transceiving communication signals representing wireless communication of the fixed-site base station with the mobile station using a first local radio link formed between the mobile station and a first local-network radio transceiver positioned at the first fixed-site subscriber station when the mobile station is positioned within a selected range of the first fixed-site subscriber station; and selectably transceiving communication signals representing wireless communication of the fixed-site base station with the mobile station using a second local radio link formed between the mobile station and a second local-network radio transceiver positioned at the second fixed-site subscriber station when the mobile station moves outside the selected range of the first fixed-site subscriber station but within the selected range of the second fixed-site subscriber station.

17. The method of claim 16 wherein the first and second fixed-site subscriber stations each include a large-area-network transceiver positioned thereat for transceiving wireless communication signals upon a large-area radio link with the fixed-site base station, wherein the first and second local-network radio transceivers are each coupled to the large-area-network transceiver positioned at the respective first or second fixed-site subscriber station such that communication signals generated at the fixed-site base station, communicated upon the large-area radio link and received at the large-area-network transceiver, are routed to the first or second local-area-network transceiver to be communicated to the mobile station upon the first or second local radio link.

18. A method for communicating in a fixed wireless access (FWA) communication system having at least a mobile station, a first fixed-site base station, a first fixed-site subscriber station capable of wirelessly communicating with the first fixed-site base station, a first local-network radio transceiver positioned at the first fixed-site subscriber station, a second fixed-site subscriber station capable of wirelessly communicating with the first fixed-site base station, a second local-network radio transceiver positioned at the second fixed-site subscriber station, and a mobile station moving between coverage areas defined by the first local-network radio transceiver and by the second local-network radio transceiver, the method comprising:

handing-off communications representing wireless communication of the fixed-site base station with the mobile station between the first local-network radio transceiver and the second local-network radio transceiver when the mobile station moves between the coverage areas.

19. The method of claim 18, further comprising:
maintaining a routing map indicating in which coverage area the mobile station is positioned.

20. An apparatus comprising:
a first local network radio transceiver positioned at a first fixed-site, fixed wireless access (FWA) communication system subscriber station communicating wirelessly with a fixed-site, fixed wireless access communication system base station, the fixed-site, fixed wireless access communication system base station communicating wirelessly with a plurality of fixed-site, fixed wireless access communication system subscriber stations, wherein the first local network radio transceiver, when a mobile station is positioned within a selected range of the first fixed-site subscriber station, receives first wireless signals representative of first communications signals from the fixed-site base station and selectively transmits second wireless signals representative of the first communications signals to the mobile satation and receives third wireless signals representative of second communications signals from the mobile station and selectively transmits fourth wireless signals representative of the second communications signals to the fixed-site base station.

21. The apparatus of claim 20, further comprising:

a first large area network radio transceiver positioned at the first fixed-site subscriber station, the large area network transceiver receiving the first wireless signals and transmitting the fourth wireless signals upon a large area radio link between the fixed-site base station and the first fixed-site subscriber station, wherein the first local network radio transceiver is coupled to the large area network radio transceiver such that the first communication signals from the fixed-site base station, communicated as the first wireless signals upon the large area radio link and received at the large area network radio transceiver, are routed to the first local area network transceiver to be communicated as the second wireless signals to the mobile station upon a local radio link between the first fixed-site subscriber station and the mobile station.

22. The apparatus of claim 21 wherein the second communication signals from the mobile station, communicated as the third wireless signals upon the local radio link to the first local network transceiver, are routed to the large area network transceiver to be communicated as the fourth wireless signals upon the large area radio link to the fixed-sited base station.

23. A wireless communications system including the apparatus according to claim 20, the wireless communications system including the fixed-site base station, the first fixed-site subscriber station, and a second fixed-site, fixed wireless access communication system subscriber station, the wireless communications system further comprising:

a second local network radio transceiver positioned at the second fixed-site subscriber station, wherein the second local network radio transceiver, when the mobile station is positioned outside a selected range of the first fixed-site subscriber station and within a selected range of the second fixed-site subscriber station, receives fifth wireless signals representative of the first communications signals from the fixed-site base station and selectively transmits sixth wireless signals representative of the first communications signals to the mobile station, and receives seventh wireless signals representative of the second communications signals from the mobile station and selectively transmits eighth wireless signals representative of the second communications signals to the fixed-site base station.

* * * * *